US007294057B2

(12) United States Patent
Lion et al.

(10) Patent No.: US 7,294,057 B2
(45) Date of Patent: Nov. 13, 2007

(54) SECURE METHOD FOR REMOTE GAME MANAGEMENT

(75) Inventors: Stéphanie Lion, Strasbourg (FR); Yan-Mei Tang-Talpin, St Grégoire (FR)

(73) Assignee: Thomson Licensing, Boulogne-Billancourt (FR)

( * ) Notice: Subject to any disclaimer, the term of this patent is extended or adjusted under 35 U.S.C. 154(b) by 501 days.

(21) Appl. No.: 10/168,170

(22) PCT Filed: Dec. 5, 2000

(86) PCT No.: PCT/FR00/03382

§ 371 (c)(1),
(2), (4) Date: Jun. 17, 2002

(87) PCT Pub. No.: WO01/45025

PCT Pub. Date: Jun. 21, 2001

(65) Prior Publication Data

US 2003/0054886 A1     Mar. 20, 2003

(30) Foreign Application Priority Data

Dec. 17, 1999  (FR) .................................. 99 15950

(51) Int. Cl.
*A63F 9/24*  (2006.01)
*G06F 19/00*  (2006.01)
*H04L 9/00*  (2006.01)
(52) U.S. Cl. .............................. 463/29; 463/1; 463/40; 463/42; 713/176; 713/179; 713/180; 380/251
(58) Field of Classification Search ............ 463/40–43, 463/1, 11–25, 29; 395/491, 800; 273/138 A; 380/251; 713/176, 179, 180
See application file for complete search history.

(56) References Cited

U.S. PATENT DOCUMENTS 4,218,582 A * 8/1980 Hellman et al. .............. 380/30

(Continued)

FOREIGN PATENT DOCUMENTS

| EP | 552 822 A2 | 7/1993 |
| WO | 97/19537 | 5/1997 |
| WO | 98/40140 | 9/1998 |

OTHER PUBLICATIONS

Russell, Selwyn. "Multisignature Algorithms for ISO 9796", 1997. ACM SIGSAC Review, vol. 15 Issue 1. pp. 11-14. Online at http://portal.acm.org/citation.cfm?id=250023. Aug. 14, 2007.*

*Primary Examiner*—Robert E. Pezzuto
*Assistant Examiner*—Meagan Thomasson
(74) *Attorney, Agent, or Firm*—Joseph J. Laks; Ronald H. Kurdyla; Joel M. Fogelson

(57) ABSTRACT

A game management center linked to at least one remote game terminal, sends the terminals to which it is linked, a message containing a game identifier and a question. The response from a player entered via a remote game terminal is transmitted in a form blinded with the aid of a secret to the game management center so as to guarantee the anonymity of the player. If the blinded response message is received before the instant of broadcasting of the response, the game management center sends an acknowledgement of receipt to said game terminal. The response in answer to the question is subsequently broadcast to all the remote game terminals. If the player has given the right answer, the terminal must, to claim its prize, send a message containing the acknowledgement of receipt and an item proving that it is in possession of the secret used to blind the response.

14 Claims, 3 Drawing Sheets

U.S. PATENT DOCUMENTS

| | | | | |
|---|---|---|---|---|
| 4,572,509 A | * | 2/1986 | Sitrick | 463/31 |
| 5,007,649 A | * | 4/1991 | Richardson | 463/25 |
| 5,179,517 A | * | 1/1993 | Sarbin et al. | 463/25 |
| 5,470,079 A | * | 11/1995 | LeStrange et al. | 463/25 |
| 5,497,479 A | * | 3/1996 | Hornbuckle | 463/29 |
| 5,547,202 A | * | 8/1996 | Tsumura | 463/29 |
| 5,577,735 A | * | 11/1996 | Reed et al. | 463/40 |
| 5,599,231 A | * | 2/1997 | Hibino et al. | 463/29 |
| 5,643,086 A | * | 7/1997 | Alcorn et al. | 463/29 |
| 5,664,778 A | * | 9/1997 | Kikuchi et al. | 273/148 B |
| 5,695,400 A | * | 12/1997 | Fennell et al. | 463/42 |
| 5,768,382 A | * | 6/1998 | Schneier et al. | 380/251 |
| 5,850,447 A | * | 12/1998 | Peyret | 463/29 |
| 5,970,143 A | * | 10/1999 | Schneier et al. | 713/181 |
| 6,001,016 A | * | 12/1999 | Walker et al. | 463/42 |
| 6,030,288 A | * | 2/2000 | Davis et al. | 463/29 |
| 6,099,408 A | * | 8/2000 | Schneier et al. | 463/29 |
| 6,106,396 A | * | 8/2000 | Alcorn et al. | 463/29 |
| 6,149,522 A | * | 11/2000 | Alcorn et al. | 463/29 |
| 6,264,557 B1 | * | 7/2001 | Schneier et al. | 463/29 |
| 6,280,325 B1 | * | 8/2001 | Fisk | 463/19 |
| 6,368,219 B1 | * | 4/2002 | Szrek et al. | 463/42 |
| 6,595,855 B2 | * | 7/2003 | Sako | 463/29 |
| 6,805,634 B1 | * | 10/2004 | Wells et al. | 463/42 |

* cited by examiner

| ID_CJ | ID_GAME | QUESTION | SIGNATURE | CERTIFICATE |

| ANSWER | ID_GAME | AUXILIARY DATA |

SECURE METHOD FOR REMOTE GAME MANAGEMENT

This application claims the benefit under 35 U.S.C. § 365 of International Application PCT/FR00/03382, filed Dec. 5, 2000, which claims the benefit of French Application No. 9915950, filed Dec. 17, 1999.

FIELD OF THE INVENTION

The present invention relates to a secure method of remote game management between a game management center and remote game terminals.

BACKGROUND ART

The organizers of games are increasingly exploiting open networks, such as the Internet, or possibilities offered by interactive television to organize remote games.

Document U.S. Pat. No. 5,850,447 describes in particular a system for participating in interactive televised games with means for verifying the chronology of the events connected with the games.

The main problems posed by remote games are:
for the organizer of the game, to be certain of the authenticity of the winner or winners, and
for the players, to be certain that their answers remain confidential until the end of the game and to receive their prizes if they win.

The solutions currently proposed for guaranteeing security in remote games consist in players registering with the organizer of the game, before playing. In this case they receive an identifier and an associated secret code which they must then use whenever they wish to play.

Having to register before being able to play implies that the player cannot play impulsively. Another drawback of this system is that the anonymity of the player is not guaranteed since he always plays under an identifier.

An aim of the present invention is to solve the aforesaid problems by proposing a novel method of remote game management allowing players to play impulsively, without any prior registration phase, and anonymously, while guaranteeing security, both from the point of view of the organizer of the game and that of the player.

SUMMARY OF THE INVENTION

To this end, the invention relates, according to a first aspect, to a secure method of remote game management between a game management center and at least one remote game terminal which comprises the following steps implemented by the remote game terminal.

The first step consists in receiving from said game management center a first message containing a game identifier as well as a question.

The second step consists in constructing a response message containing the game identifier and the response of a player using said game terminal to said question; the third step consists in blinding the response message with a secret; and the fourth step consists in transmitting the blinded response message to the game management center.

The fifth step consists in receiving from said game management center an acknowledgement of receipt when the player's response sent during the fourth step has been taken into account by the game management center.

By virtue of the method of the invention, the player can play impulsively since he need not be preregistered with the game management center. Moreover, sending his response in a blinded form guarantees his anonymity and at the same time the security of the transmission of his response.

According to a first embodiment of the invention, the third step consists in generating a secret random number; in applying a one-way function to this secret number so as to generate a public blinding number and in using the public blinding number to blind the response message.

According to a second embodiment of the invention, the third step consists in enciphering the response message with the aid of a symmetric secret key generated by said remote game terminal.

According to a particular embodiment, the first message sent during the first step furthermore comprises: an identifier of the game management center; a certificate, delivered by a certification authority to the game management center, decipherable with the aid of a public key of the certification authority, yielding the public key of the game management center corresponding to the identifier of said game management center; and a signature of part or of the whole of said message with the aid of the private key associated with the public key of the game management center.

This advantageously makes it possible to authenticate the game management center and, in particular, to ensure that the question posed does indeed originate from a game organizer accredited by the certification authority and has not been altered during transmission by a hacker.

According to another aspect of this particular embodiment, each remote game terminal contains the public key of the certification authority and, during the second step, the remote game terminal undertakes, before constructing the response message, the verification of the authenticity of the game management center with the aid of said public key of the certification authority.

According to another particular embodiment of the invention, the response message constructed in the second step by the remote game terminal furthermore contains auxiliary customization data. This can comprise the name of the player, his address, his telephone number, etc. These data are of course transmitted in hidden form by virtue of the public blinding number so as to guarantee the anonymity of the player and will not be disclosed other than in the case where the player wins and wishes to obtain his prize.

According to another preferred embodiment of the invention, the blinded response message is transmitted during the fourth step in a form enciphered with the aid of the public key of the game management center. This offers a second level of security, in addition to the blinding of the response.

According to another embodiment of the invention, the acknowledgement of receipt sent during the fifth step comprises a signature, with the aid of the private key associated with the public key of the game management center, of a message formed of the concatenation of the game identifier and of the blinded response message sent by the remote game terminal.

According to another aspect of the invention, the method comprises a following additional step of claiming the prize won by a player when the player's response sent during the fourth step is the right answer to the question contained in the first message received during the first step.

The sixth step consists, in respect of the remote game terminal used by the winning player, in sending the game management center a message claiming the prize containing at least: the acknowledgement of receipt received from the game management center in the fifth step; and an item proving that said game terminal is in possession of the secret used to blind the response message in the third step.

If the response message has been blinded during the third step according to the first embodiment of the invention, then the item transmitted in the sixth step comprises, in a first variant, the public blinding number and the secret random number which were generated in the third step.

In a second variant, the item transmitted in the sixth step comprises the public blinding number and a means of proving, via a zero-knowledge protocol, that the terminal is moreover in possession of the secret random number used to generate said public blinding number.

If the response message has been blinded during the third step according to the second embodiment of the invention, then the item transmitted in the sixth step comprises the symmetric secret key.

The invention also relates to a remote game terminal capable of implementing at least one of steps 1 to 6 of the method hereinabove.

The invention also relates, according to a second aspect, to a secure method of remote game management between a game management center and at least one remote game terminal which comprises the following steps implemented by the game management center.

The first step consists in sending the remote game terminal a first message containing a game identifier as well as a question.

The second step consists in receiving from said remote game terminal the response of a player in a response message blinded with a secret known only to the remote game terminal.

The third step consists in verifying that the blinded response message is received at an instant prior to that of the broadcasting of the response to the question posed in the first step.

The fourth step consists, in case of positive verification during the third step, in sending an acknowledgement of receipt to said remote game terminal.

The fifth step consists in broadcasting the response to the question posed in the first step to said remote game terminal.

In a particular embodiment of this aspect of the invention, the game management center is linked to all the remote game terminals by a first bidirectional communication path and by a second monodirectional communication path from the management center to the terminals. According to this embodiment, the first message is sent during the first step, via said monodirectional communication path. It may for example be a path for broadcasting over the airwaves, by cable or by satellite.

According to another aspect of this embodiment, the broadcasting of the response during the fifth step is performed via the monodirectional communication path.

According to another particular embodiment of this second aspect of the invention, the method comprises additional steps, implemented by the game management center, of dispatching the prize to a winning player.

The sixth step consists in receiving from a remote game terminal used by the winning player a message claiming the prize containing at least: the acknowledgement of receipt sent in the fourth step; and an item proving that said remote game terminal is in possession of the secret used to blind the response message received in the second step.

The seventh step consists in verifying the validity of the response received in said message claiming the prize.

The eighth step consists, in case of positive verification during the seventh step, in implementing means for dispatching the prize to the winning player.

The invention furthermore relates to a game management center capable of implementing at least one of steps 1 to 8 of the method hereinabove.

BRIEF DESCRIPTION OF THE DRAWINGS

Other characteristics and advantages of the invention will emerge from the following detailed description, taken by way of nonlimiting example, with reference to the appended drawings in which:

FIGS. 4 and 5 illustrate the content of messages which are used in the method of the invention.

DETAILED DESCRIPTION OF EMBODIMENTS OF THE INVENTION

The method of remote game management which will be detailed hereinbelow can be implemented in various types of environments. It is more especially adapted to applications of games on the Internet or within the framework of interactive television.

Figure 1:
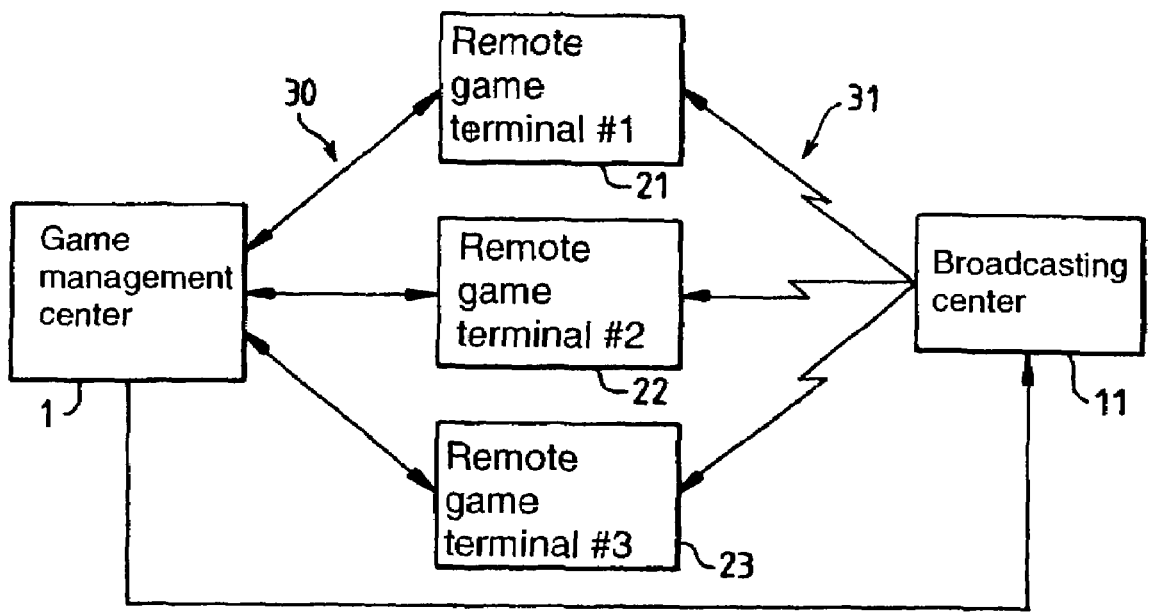
FIG. 1 illustrates a game management center linked up to several remote game terminals according to a first embodiment of the invention.

Represented in FIG. 1 is a first exemplary environment adapted to the method of the invention. The game management center 1, located for example at a game organizer, is a server in which a game application is executed. It is linked to remote game terminals 21, 22, 23 situated at users through a first bidirectional network 30.

The remote game terminals may for example be television receivers comprising a module furnished with a microprocessor in which a game application corresponding to that executed in the server 1 is executed. They may also be decoders of digital or analog televised signals transmitted by cable or by satellite or even game consoles. The remote game terminals comprise a user interface consisting in particular of a display screen making it possible to depict questions posed by the organizer of the game, of a keypad or of any other means making it possible to enter an answer in response to the question posed (in particular a remote control).

In the example of FIG. 1, the game management center 1 is associated with a broadcasting center 11 which communicates with the remote game terminals through a second monodirectional network 31.

For example, in the case where the organizer of the game is a distributor of televised programs, the broadcasting center 11 is that via which he already broadcasts his programs. The monodirectional network 31 is for example a network for broadcasting over the airwaves, by cable or by satellite, digital or analog televised signals. It makes it possible to transmit items of information simultaneously from the game management center 1 to all the remote game terminals 21, 22, 23 to which it is linked.

The first bidirectional network 30 is for example formed of the telephone lines of the Switched Telephone Network or else of higher speed special-purpose digital lines. In the case where the game method is implemented within the framework of interactive television, the bidirectional network 30 forms the return path for the interactive programs. This network 30 makes it possible to establish individual communications in both directions between each remote game terminal and the game management center.

Figure 2:
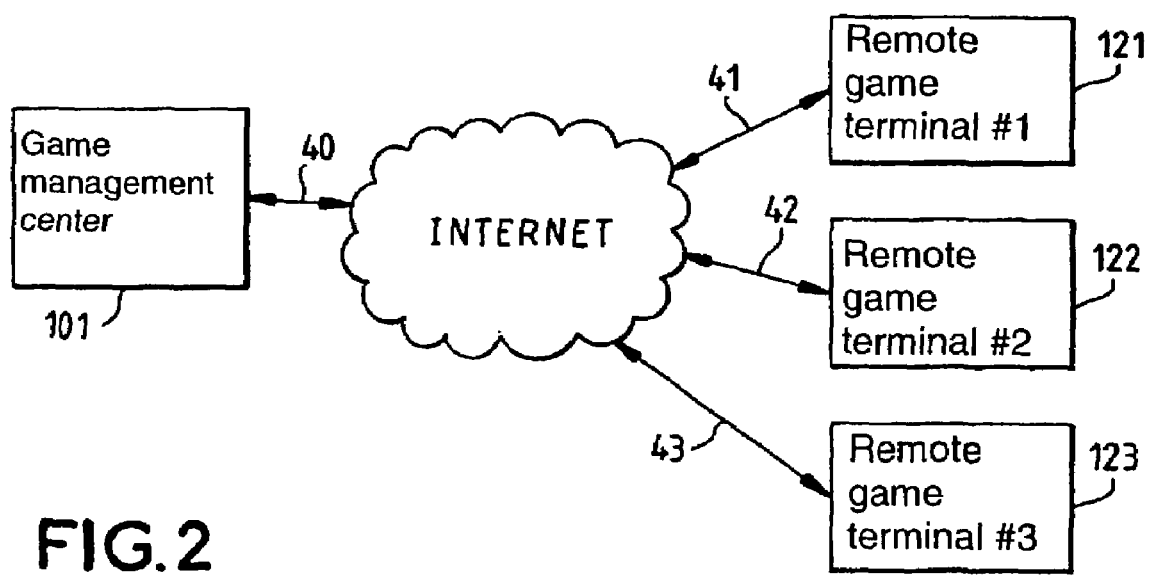
FIG. 2 illustrates a game management center linked up to several remote game terminals according to a second embodiment of the invention.

In a second type of environment for implementing the game method according to the invention, represented in FIG. 2, the game management center 101 is linked to the Internet network by way of a bidirectional link 40 and each of the remote game terminals 121, 122, 123 is also linked to the Internet network by a bidirectional link 41, 42, 43.

In this exemplary application, the remote game terminals consist for example of personal computers located at users forming potential players.

Figure 3:
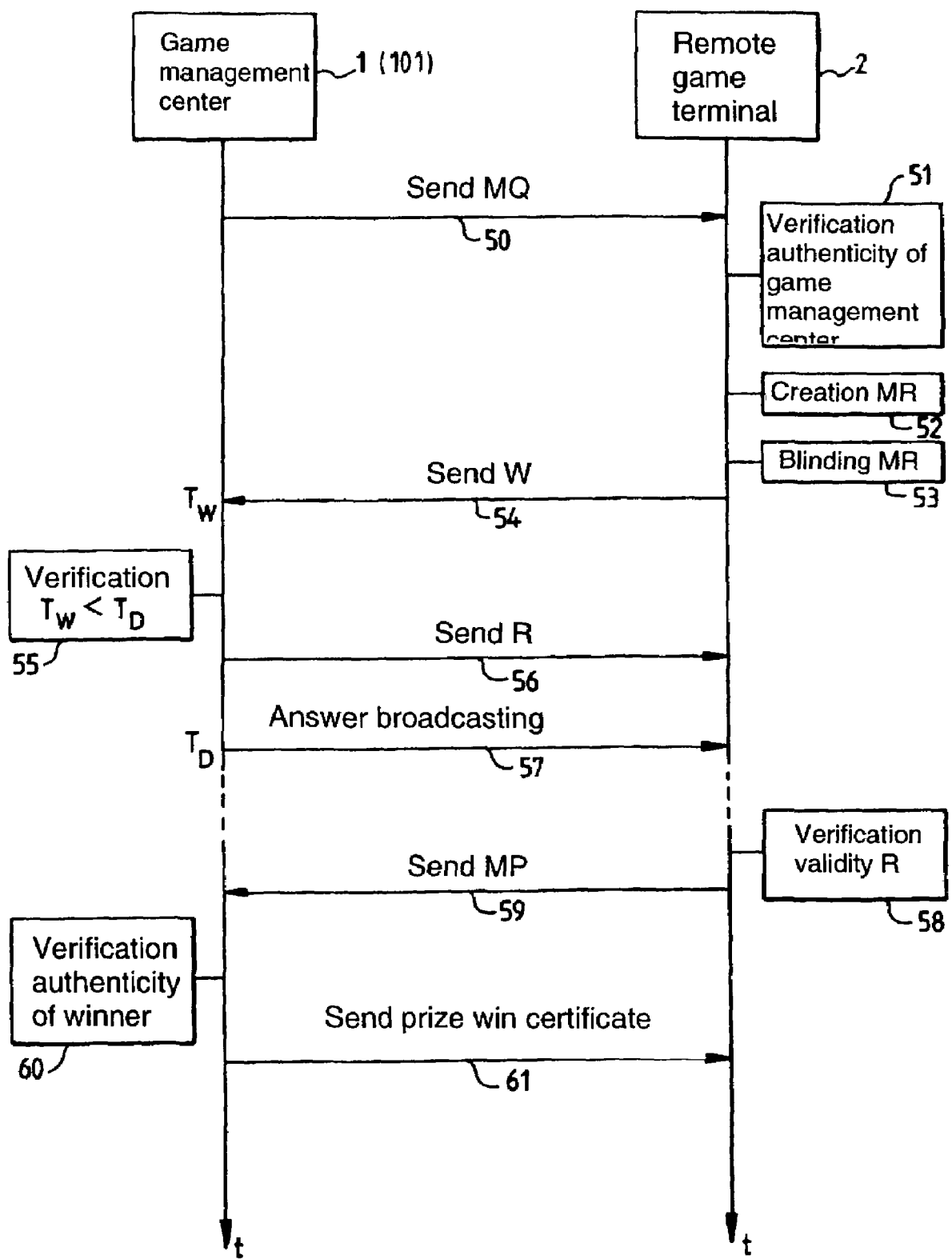
FIG. 3 illustrates the method of remote game management according to the invention.

We shall now describe the game management method proper in conjunction with FIGS. 3 to 5.

The game management method of the invention is especially adapted to games in which a question is posed to the players, giving them a certain time in which to respond. It may involve a meaningful question requiring particular knowledge in order to answer it. In the case of a lottery, the question may invite the players to bet on a future random draw. In this case, the expected response will be the result of the lottery draw.

Illustrated diagrammatically in FIG. 3 is the method of game management according to the invention between a game management center 1 or 101 and a given remote game terminal 2 from among all those to which the game management center is linked. The various steps of the game management method have been represented along a time axis t which is split into two so as to illustrate the exchanges which take place between the two devices.

The first part of the game management method which will be described relates to the actual game, that is to say the act of posing a question and the manner of answering it anonymously.

During the first step 50, a question is sent by the game management center to all the remote game terminals to which it is linked. As was seen above, this question may be posed during a televised game (for example in the form of a message appearing overlaid on the screen) or else on an Internet site. The actual manner in which the question is posed does not form the subject of the present invention and will not be described further below.

In practice, the question posed is transmitted from the game management center to each remote game terminal in the form of a message MQ which is sent preferably via the monodirectional communication path 31 (FIG. 1) if it exists and, in the converse case, via the bidirectional communication path 40-43 (FIG. 2). This message can in particular be sent in the stream of the video signal if the game takes place within the framework of an interactive television transmission.

The message MQ whose content is represented diagrammatically in FIG. 4, contains a game identification number ID_GAME which is different for each game (that is to say for each new question posed) and which uniquely identifies the question posed. This game identification number is transmitted at the same time as the question itself ("QUESTION"—FIG. 4) in the message MQ.

Optionally, the game management center can also send, in the message, authentication elements allowing the remote game terminals to verify that the question posed originates from a game management center accredited by a certification authority and has not been altered during transmission.

To do this, the message MQ preferably contains a number identifying the game management center ID_CJ, this number being different for each game management center and being allocated by a certification authority uniquely to each game management center. The certification authority also allocates each game management center a certificate which enables the identifier of the game management center ID_CJ and its public key $K_{PUB\_CJ}$ to be associated in a secure manner. Specifically, a well-known means of securing the transmission of information is to use public-key cryptographic systems in which each party possesses a private key which is known only to him and a public key which is known to the other parties. The certification authority itself possesses a private key with which it signs the certificates and a public key, which is contained in the remote game terminals as will be seen below to enable them to verify the validity of the certificates.

In the present application, use will preferably be made of a certificate established according to the ITU-T standard, Recommendation X.509/ISO/IEC 9594-8 to which reference may be made for further details.

The certificate is transmitted in the message MQ ("CERTIFICATE"—FIG. 4) which also contains a signature of the message ("SIGNATURE") with the aid of the private key $K_{PRI\_CJ}$ associated with the public key $K_{PUB\_CJ}$ of the game management center. The signature is for example defined as follows:

$$\text{Sign}_{K_{PRI\_CJ}}(\text{ID\_CJ} \| \text{QUESTION}) \tag{1}$$

where "$\|$" represents the concatenation operator and "Sign" is a known mathematical function, such as a hash function, which is such that there exists a corresponding function "Verif" satisfying:

$$\text{Verif}_{K_{PUB\_CJ}}(\text{Sign}_{K_{PRI\_CJ}}(M1), M2) = \text{true if } M1 = M2 \tag{2}$$
$$\text{Verif}_{K_{PUB\_CJ}}(\text{Sign}_{K_{PRI\_CJ}}(M1), M2) = \text{false if } M1 \neq M2$$

where M1, M2 are any messages.

This makes it possible to verify that a message does indeed originate from the game management center and has not been altered during transmission thereof.

The next step 51 of the method consists, in respect of the remote game terminal 2, in verifying the authenticity of the game management center.

To do this, as was seen above, each game terminal distributed to users contains the public key of the certification authority. By virtue of this public key, the game terminal verifies the content of the CERTIFICATE and recovers the public key $K_{PUB\_CJ}$ of the game management center. It can thus ensure that the identification number of the game center ID_CJ contained in the message does indeed correspond to that present in the certificate. With the aid of this public key $K_{PUB\_CJ}$ the game terminal can moreover verify that the SIGNATURE contained in the message MQ does indeed correspond to the content of the message by using the Verif function set forth hereinabove.

In the next step 52 it is assumed that a player using the remote game terminal 2 has responded with an answer to the question contained in the message MQ and has entered it with the aid of the user interface of the game terminal. The game terminal then constructs a message MR, whose content is illustrated in FIG. 5, and which contains the answer entered by the player ("ANSWER"), the game identification number ID_GAME as well as, preferably, AUXILIARY customization DATA for example: the name or the first name of the player, his address, his telephone number, etc.).

According to the principle of the invention, this message is then blinded with the aid of a secret, during step 53, so as to guarantee the anonymity of the player when he sends his answer.

To do this, according to a preferred embodiment, the remote game terminal generates a random number x. This number can for example emanate from a pseudo-random generator as is known to the person skilled in the art. This number must remain secret and may not be communicated outside of the game terminal. It will subsequently serve to prove that the player did indeed give the right answer if he wins the game.

The game terminal 2 then uses this secret random number x to create a public blinding number y, which will form the secret used to blind the response message MR. This public blinding number y must be created from the secret number x in such a way that it is impossible to retrieve x, knowing y and the function used to form y from x.

A one-way function f is therefore used to calculate y from x.

A function based on a discrete logarithm will preferably be used as function f, and is described in particular in the ISO 9796 standard, part 4 and which is defined by the following relation (3):

$$y = g^x \bmod p \quad (3)$$

where p and g are known values, p being a large prime number (with a minimum of 512 bits), g being a generator of Z/pZ (Z being the set of rational integers) and "mod" being the modulo function.

With the aid of this public blinding number y, the remote game terminal 2 then performs the following calculation (4) to create the blinded response message W:

$$W = y \oplus MR \quad (4)$$

where $\oplus$ represents the "exclusive OR" function (or "XOR").

Other calculations are obviously possible for blinding the response message MR with the aid of the number y, in particular it will be possible to perform a multiplication of the two terms, modulo p.

In a second embodiment of the invention, the blinding of the message MR is performed by enciphering with the aid of a symmetric secret key $K_y$ generated by the remote game terminal, preferably according to the DES standard (Data Encryption Standard).

During the next step 54, the remote game terminal 2 sends the blinded response message W to the game management center.

In accordance with the aim of the invention, the player's response is made secure and anonymous since it is impossible, without knowing y or $K_y$, to retrieve the player's response from the message W alone.

Nevertheless, it is possible in a variant embodiment to add an additional level of security by sending the message W in a form enciphered with the aid of the public key of the game management center $K_{PUB\_CJ}$ which the terminal has recovered during step 51.

The game management center receives the message W at an instant $T_W$. During the next step 55 it verifies that this instant $T_W$ is indeed prior to that $T_B$ of the broadcasting of the response to the question posed during step 50. This makes it possible to guarantee that the player has not cheated and has not sent his answer after the right answer was broadcast by the organizer of the game.

The game management center then sends the game terminal, during step 56, an acknowledgement of receipt R guaranteeing to the player that his blinded response has indeed been registered by the organizer of the game. The acknowledgement of receipt is, according to a preferred embodiment, calculated as follows:

$$R = \text{Sign}_{K_{PRI\_CJ}}(\text{ID\_GAME} \| W) \quad (5)$$

that is to say by calculating the digital signature, with the aid of the private key $K_{PRI\_CJ}$ associated with the public key $K_{PUB\_CJ}$ of the game management center, of the message formed of the concatenation of the game identifier ID_GAME and of the blinded response message W.

Finally, the first part of the game management method terminates with the broadcasting of the right answer by the game management center, at the instant $T_D$ (step 57). Preferably, the broadcasting of the answer is performed via the monodirectional network 31 (FIG. 1) in the case where one exists, in particular in the case of an interactive televised game. If the game is Internet-based, the answer may be indicated on the Internet site of the organizer of the game. The actual manner of broadcasting the answer does not form the subject of the present invention and will not be described further below.

Among the steps just described, it is obvious that steps 51 to 56 may be performed for each remote game terminal to which the management center is linked.

The second part of the game management method relates to the case where a player has given the right answer to the question posed and claims his prize. It is assumed that the second part begins when the player has verified that the answer broadcast in step 57 corresponded to the answer which he gave during step 52 and that he has issued an instruction, by virtue of the user interface of the game terminal 2, to claim his prize from the organizer of the game.

The game terminal 2 must then prove to the game management center that the layer did indeed give the right answer when he played (in steps 52 to 54). It must also prove that it knows the secret which served to blind the response. This makes it possible to guarantee that only the authentic winner can receive a prize.

To do this, the game terminal 2 will use the acknowledgement of receipt R which was sent by the game management center in step 56 as proof of the registering of the player's answer with the game organizer.

During a first step 58, the remote game terminal 2 firstly verifies the validity of the acknowledgement of receipt R with the aid of the public key $K_{PUB\_CJ}$ of the game management center by using for example the Verif function set forth hereinabove.

When the verification is positive, thereby proving that the acknowledgement of receipt R has not been altered by a third party, the game terminal sends (step 59) the game management center a message MP proving that the player had given the right answer and that the latter did indeed emanate from him.

When the response message MR has been blinded in step 53 according to the first, preferred, embodiment of the invention, the message MP contains the acknowledgement of receipt R as well as the number y which served to blind the message MR so as to form the message W. The acknowledgement of receipt makes it possible to prove that the game terminal had indeed sent the blinded response W in step 54.

To prove that the blinded response message W did indeed emanate from the remote game terminal 2, it is also necessary to prove that the latter knew the secret number x which served to calculate y. Still in this first embodiment, according to a first variant, the message MP therefore moreover contains the secret random number x.

In a second variant of the first embodiment, the message MP contains the acknowledgement of receipt R and the public blinding number y but it does not contain the secret number x. In this preferred variant embodiment, a zero-knowledge protocol is used to prove to the game management center that the remote game terminal 2 knew the secret number x without directly revealing this number x.

When the one-way function defined by relation (3) hereinabove has been used to calculate y from x, the Schnorr authentication protocol will preferably be used to prove the knowledge of x without transmitting x directly. This protocol runs as follows:

1. The remote game terminal 2 generates a random number $r_1$ from which it calculates a number $z_1$ according to relation (6) hereinbelow and it sends this number $z_1$ in the message MP;

$$z_1 = g^{r_1} \bmod p \quad (6)$$

2. The game management center sends a binary number $b_1$ (equal to 0 or 1) to the game terminal 2 in response;

3. The game terminal 2 calculates the value $u_1$ according to relation (7) hereinbelow and sends it to the game management center;

$$u_1 = r_1 - b_1 \times x \quad (7)$$

4. The game management center verifies that relation (8) hereinbelow is true:

$$g^{u_1} = y^{b_1} \times z_1 \quad (8)$$

These steps 1. to 4. must be repeated several times with different numbers $r_j$, $z_j$, $b_j$ and $u_j$ so as to convince the game management center that the game terminal 2 knows x.

When the response message MR has been blinded in step 53 according to the second embodiment of the invention, the message MP sent in step 59 contains the acknowledgement of receipt R as well as the secret key $K_y$. The acknowledgement of receipt makes it possible to prove that the game terminal did indeed send the blinded response W in step 54 and the key $K_y$ makes it possible to prove that the terminal knows the secret which served to blind the response message.

Advantageously, so as to further improve the security of the exchanges, all the messages exchanged between the game management center and the remote game terminal 2 are enciphered. Thus, the message MP sent in the first variant of the first embodiment (or in the second embodiment) is transmitted in a form enciphered with the aid of the public key $K_{PUB\_CJ}$ of the game management center. In the second variant of the first embodiment, the messages sent from the game terminal 2 to the game management center (message MP, and sending of the number $u_j$) are enciphered with the aid of the public key $K_{PUB\_CJ}$ while the messages sent from the game management center to the remote terminal are enciphered with the aid of the private key $K_{PRI\_CJ}$ of the game management center.

In step 60, the game management center verifies the authenticity of the winner, that is to say it verifies, on sight of the message MP alone in the first variant of the first embodiment (or in the second embodiment), or else on sight of the messages exchanged according to the Schnorr authentication protocol in the second variant of the first embodiment, that the player's response was the right answer and that it did indeed emanate from him.

In the case where the verification is positive, a prize win certificate is sent to the remote game terminal 2 in step 61 so as to enable the player to receive his prize on presentation of this certificate.

Any appropriate means may be implemented for dispatching the prize to the winner.

What is claimed is:

1. A secure method of remote game management between a game management center and at least one remote game terminal, wherein the method is performed by said remote game terminal, the method comprising the steps of:
   a) receiving from said game management center a first message containing a game identifier as well as a question;
   b) constructing a response message containing the game identifier and the response of a player using said game terminal;
   c) blinding the response message with a secret known only to the game terminal;
   wherein said blinding step comprises:
      generating a secret random number;
      applying a one-way function to this secret number so as to generate a public blinding number; and
      using said public blinding number to blind the response message;
   d) transmitting the blinded response message to the game management center;
   e) receiving from said game management center an acknowledgement of receipt when the players response sent in step d) has been taken into account by the game management center;
   said method comprising an additional step of claiming a prize won by a player when the player's response sent during step d) is the right answer to the question contained in the message received in step a), wherein said additional step comprises;
   f) sending to the game management center a message claiming the prize containing at least;
      the acknowledgement of receipt received from the game management center in step e); and
      an item proving that said game terminal is in possession of the secret used to blind the response message in step c).

2. The method as claimed in claim 1, wherein the one-way function is a function based on a discrete logarithm defined by the following relation:

$$y = g^x \bmod p$$

where p and g are known values, p being a prime number with a minimum of 512 bits, g being a generator of Z/pZ, Z being the set of rational integers, said mod being the modulo function and x and y being values corresponding to a parameter and result of the function, respectively.

3. The method as claimed in claim 1, wherein the first message received during step a) furthermore comprises:
   an identifier of the game management center;
   a certificate, delivered by a certification authority to the game management center, decipherable with the aid of a public key of the certification authority, yielding a public key of the game management center corresponding to the identifier of said game management center; and
   a signature of part or of the whole of said message with the aid of a private key associated with the public key of the game management center.

4. The method as claimed in claim 3, in which said remote game terminal contains the public key of the certification authority, wherein, during step b), the remote game terminal undertakes, before constructing the response message, the verification of the authenticity of the game management center with the aid of the certificate delivered by the certification authority.

5. The method as claimed in claim 3, wherein the response message constructed in step b) furthermore contains auxiliary customization data.

6. The method as claimed in claim 3, wherein the blinded response message is transmitted in step d) in a form enciphered with the aid of the public key of the game management center.

7. The method as claimed in claim 3, wherein the acknowledgement of receipt received during step e) comprises a signature, with the aid of the private key associated with the public key of the game management center, of a message formed of the concatenation of the game identifier and of the blinded response message.

8. The method as claimed in claim 3, wherein any message sent by the remote game terminal to the game management center in the course of step f) is transmitted in a form enciphered with the aid of the public key of the game management center.

9. The method as claimed in claim 1, wherein the item transmitted in step f) by the remote game terminal to the game management center to prove that said terminal is in possession of the secret comprises:
the public blinding number and the secret random number which were generated in step c).

10. The method as claimed in claim 1, wherein the item transmitted in step f) by the remote game terminal to the game management center to prove that said terminal is in possession of the secret comprises:

the public blinding number and a means of proving, via a zero-knowledge protocol, that the terminal is in possession of the secret random number used to generate said public blinding number.

11. The method as claimed in claim 10, wherein the zero-knowledge protocol used is the Schnorr authentication protocol.

12. The method as claimed in claim 10, wherein the messages received from the game management center by said remote game terminal within the framework of the zero-knowledge protocol are transmitted in a form enciphered with the aid of the private key associated with the public key of the game management center.

13. The method as claimed in claim 1, wherein, during step f), the remote game terminal undertakes, before sending the message claiming the prize, the verification of the validity of the acknowledgement of receipt received from the game management center during step e).

14. The method as claimed in claim 1, wherein the game identifier identifies a game session.

* * * * *